United States Patent
Tenny et al.

(10) Patent No.: US 8,942,713 B2
(45) Date of Patent: Jan. 27, 2015

(54) METHOD AND APPARATUS FOR ALLOCATING RESOURCES IN A MULTICAST/BROADCAST COMMUNICATIONS SYSTEM

(75) Inventors: Nathan Edward Tenny, Poway, CA (US); Masato Kitazoe, Machida (JP); Francesco Grilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 690 days.

(21) Appl. No.: 11/293,526

(22) Filed: Dec. 2, 2005

(65) Prior Publication Data

US 2006/0178153 A1 Aug. 10, 2006

Related U.S. Application Data

(60) Provisional application No. 60/651,395, filed on Feb. 8, 2005.

(51) Int. Cl.
*H04W 72/00* (2009.01)
*H04W 48/20* (2009.01)
*H04W 72/02* (2009.01)

(52) U.S. Cl.
CPC .............. *H04W 48/20* (2013.01); *H04W 72/02* (2013.01)
USPC ..... 455/450; 455/451; 455/452.1; 455/452.2; 455/453

(58) Field of Classification Search
None
See application file for complete search history.

(56) References Cited

U.S. PATENT DOCUMENTS

| | | | |
|---|---|---|---|
| 5,398,258 A * | 3/1995 | Su et al. ........................ | 375/277 |
| 5,729,531 A * | 3/1998 | Raith et al. .................... | 370/252 |
| 5,761,623 A | 6/1998 | Lupien et al. | |
| 6,016,428 A | 1/2000 | Diachina et al. | |
| 6,108,524 A | 8/2000 | Hershey et al. | |
| 6,259,915 B1 | 7/2001 | Raith | |
| 6,304,756 B1 * | 10/2001 | Hebeler et al. ................ | 455/450 |
| 6,625,132 B1 | 9/2003 | Boettger et al. | |

(Continued)

FOREIGN PATENT DOCUMENTS

| | | |
|---|---|---|
| CN | 1331891 A | 1/2002 |
| DE | 19915584 | 10/1999 |

(Continued)

OTHER PUBLICATIONS

3rd Generation Partnership Project "UE Procedures in Idle Mode and Procedures for Cell Reselection in Connected Mode (Release 4)", Jun. 2002.*

(Continued)

*Primary Examiner* — Mehmood B Khan
(74) *Attorney, Agent, or Firm* — Darren M. Simon

(57) ABSTRACT

Methods, systems and apparatus for dispersing a group of user equipment (UEs) concentrated on a single channel is disclosed. After receiving a disperse command the UEs select a channel, and then select a cell. The channel selection may be performed using a random or pseudorandom function. The cell selection may be performed prior to camping on the cell. Prior to camping the UEs may test the acceptability of a candidate cell and/or may perform a cell reselection. The result of the dispersion is that the UEs are distributed amongst many channels (a, b, c, and d), where reference are found in FIGS. 1A and 1B.

26 Claims, 4 Drawing Sheets

(56) References Cited

U.S. PATENT DOCUMENTS

| | | | |
|---|---|---|---|
| 6,747,965 | B1 | 6/2004 | Nara et al. |
| 7,062,271 | B2 | 6/2006 | Choi |
| 7,373,148 | B2 | 5/2008 | Kim et al. |
| 2002/0052201 | A1 | 5/2002 | Wilhelmsson et al. |
| 2003/0040311 | A1 | 2/2003 | Choi |
| 2003/0203735 | A1* | 10/2003 | Andrus et al. ........... 455/450 |
| 2004/0043798 | A1 | 3/2004 | Amerga et al. |
| 2004/0109431 | A1 | 6/2004 | Abrahamson et al. |
| 2004/0190471 | A1 | 9/2004 | Bender et al. |
| 2004/0192287 | A1 | 9/2004 | Namiki et al. |
| 2005/0245260 | A1 | 11/2005 | Nielsen et al. |
| 2006/0166694 | A1 | 7/2006 | Jeong et al. |
| 2006/0258386 | A1 | 11/2006 | Jeong et al. |
| 2007/0004445 | A1 | 1/2007 | Dorsey et al. |
| 2007/0037577 | A1 | 2/2007 | Dalsgaard et al. |
| 2007/0223510 | A1 | 9/2007 | Joo |
| 2009/0034452 | A1 | 2/2009 | Somasundaram et al. |
| 2009/0047954 | A1 | 2/2009 | Tenny et al. |
| 2009/0067386 | A1 | 3/2009 | Kitazoe |
| 2009/0088160 | A1 | 4/2009 | Pani et al. |
| 2009/0264133 | A1* | 10/2009 | Lee et al. ................. 455/436 |
| 2010/0184429 | A1 | 7/2010 | Tod et al. |
| 2010/0304749 | A1 | 12/2010 | Dwyer et al. |
| 2010/0317349 | A1 | 12/2010 | Serravalle |
| 2011/0064059 | A1 | 3/2011 | Hooli et al. |
| 2011/0110327 | A1 | 5/2011 | Ramachandran et al. |
| 2011/0171926 | A1 | 7/2011 | Faccin et al. |
| 2011/0176424 | A1 | 7/2011 | Yang et al. |
| 2011/0216732 | A1 | 9/2011 | Maeda et al. |
| 2012/0322446 | A1 | 12/2012 | Ramachandran et al. |
| 2012/0322447 | A1 | 12/2012 | Ramachandran et al. |

FOREIGN PATENT DOCUMENTS

| | | |
|---|---|---|
| EP | 1503608 | 2/2005 |
| EP | 2146540 A1 | 1/2010 |
| EP | 2249607 A1 | 11/2010 |
| JP | 60077259 | 5/1985 |
| JP | 05075530 | 3/1993 |
| JP | 05244075 | 9/1993 |
| JP | 10322760 | 12/1998 |
| JP | 2000175243 | 6/2000 |
| JP | 2004312721 A | 11/2004 |
| JP | 2008502253 A | 1/2008 |
| KR | 20060114947 A | 11/2006 |
| KR | 20070069930 A | 7/2007 |
| WO | WO0022853 A1 | 4/2000 |
| WO | WO0158054 A1 | 8/2001 |
| WO | 0195504 A | 12/2001 |
| WO | WO2005122621 A1 | 12/2005 |
| WO | 2007086679 A1 | 8/2007 |
| WO | 2007113457 A1 | 10/2007 |
| WO | 2008099341 A2 | 8/2008 |
| WO | 2008157713 | 12/2008 |
| WO | 2009007720 | 1/2009 |
| WO | 2009020874 | 2/2009 |

OTHER PUBLICATIONS

3GPP TS 25.302 V6.4.0 (Dec. 2004).
International Search Report and Written Opinion—PCT/US2006/004481, International Search Authority—European Patent Office—Jul. 7, 2006.
Taiwan Search Report—TW095104201—TIPO—Dec. 26, 2011.
3GPP TS 25.304 V4.0.0 (Mar. 2001) 3rd Generation Partnership Project: Technical Specification Group Radio Access Network; UE prodecures in Idle Mode and Procedures for Cell Reselection in Connected Mode (Release 4) Mar. 27, 2001.
Dorot, V.et al.: "An Explanatory Dictionary of Modern Computer Terms," 2nd Edition, bhv, Saint Petersburg, 2001, 'Program Product' on p. 339.
European Search Report—EP11159506—Search Authority—The Hague—Apr. 8, 2011.
3GPP TS 36.304 V10.1.0 (Mar. 2011) 3rd Generation Partnership Project; Technical Specification Group Radio Access Network; Evolved Universal Terrestrial Radio Access (E-UTRA); User Equipment (UE) procedures in idle mode (Release 10), 33 pages.
3GPP TS 36.331 V10.1.0 (Mar. 2011) 3rd Generation Partnership Project; Technical Specification Group Radio Access Network; Evolved Universal Terrestrial Radio Access (E-UTRA); Radio Resource Control (RRC); Protocol specification (Release 10), 290 pages.
3GPP TS 44.018, "Mobile radio interface layer 3 specification; Radio Resource Control (RRC) protocol", V9.8.0, Release 9, Mar. 2011, pp. 1-431.
3rd Generation Partnership Project; Technical Specification Group Core Network and Terminals; Non-Access-Stratum (NAS) functions related to Mobile Station (MS) in idle mode (Release 10), 3GPP Standard; 3GPP TS 23.122, 3rd Generation Partnership Project (3GPP), Mobile Competence Centre; 650, Route Des Lucioles; F-06921 Sophia-Antipolis Cedex; France, No. V10.3.0, Mar. 1, 2011, pp. 1-43, XP050476762, [retrieved on Apr. 1, 2011].
3rd Generation Partnership Project; Technical Specification Group GSM/EDGE Radio Access Network; Radio subsystem link control (Release 10), 3GPP Standard; 3GPP TS 45.008, 3rd Generation Partnership Project (3GPP), Mobile Competence Centre; 650, Route Des Lucioles; F-06921 Sophia-Antipolis Cedex; France, No. V10.0.0, Mar. 1, 2011, pp. 1-148, XP050476679, [retrieved on Apr. 1, 2011].
Digital cellular telecommunications system (Phase 2); Mobile radio interface layer 3 specification; Radio Resource Control (RRC) protocol (3GPP TS 44.018 version 10.2.0 Release 10), Technical specification, European telecommunications standards institute (Etsi), 650, route des lucioles;F-06921 sophia-antipolis; France, vol. 3gpp Geran 2, No. V10.2.0, Mar. 1, 2011, XP014065422.
Ericsson: "Ericsson comments on NSP problems", 3GPP Draft; NSW-060015-Ericsson-NSP-Comments, 3rd Generation Partnership Project (3GPP), Mobile Competence Centre ; 650, Route Des Lucioles ; F-06921 Sophia-Antipolis Cedex ; France, no. Amsterdam, Netherlands; 20060124-20060125, Jan. 18, 2006, XP050647762, [retrieved on Jan. 18, 2006].
Nokia Siemens Networks et al: "1 Introduction 2 Operation in a multi-RAT scenario", 3GPP Draft; GP-071684 Interworking Priorities, 3rd Generation Partnership Project (3GPP), Mobile Competence Centre; 650, Route Des Lucioles; F-06921 Sophia-Antipolis Cedex; France, vol. TSG GERAN, no. Vancouver, Canada; 20071112-20071116, Nov. 7, 2007, XP050594012, [retrieved on Nov. 7, 2007].
Tamea, et al., "A Probability based Vertical Handover Approach to Prevent Ping-Pong Effect," 2009 6th International Symposium on Wireless Communication Systems (ISWCS 2009), Sep. 7-10, 2009, Tuscany, IEEE, pp. 181-185.

* cited by examiner

METHOD AND APPARATUS FOR ALLOCATING RESOURCES IN A MULTICAST/BROADCAST COMMUNICATIONS SYSTEM

CLAIM OF PRIORITY UNDER 35 U.S.C. §119

The present Application for Patent claims priority to Provisional Application No. 60/651,395 entitled "Method and Apparatus for Allocating Resources in a Multicast/Broadcast Communications System" filed Feb. 8, 2005, and assigned to the assignee hereof and expressly incorporated by reference herein.

BACKGROUND

1. Field he present invention relates generally to a wireless communications network with multiple, potentially mobile User Equipment (UEs) communicate with a group of base stations, and more specifically to multicast/broadcast communications in such a network.

2. Background

FIG. 1A is an illustration of an exemplary wireless communications network. A group of User Equipment (UE, one of which is labeled 20), some or all of which may be mobile, are in communication with a group of base stations (one of which is labeled 26). At any given moment each UE 20 communicates with a base station 26 using a certain channel (a, b, c, or d). As used herein a channel includes an arrangement of frequencies or communications links to facilitate communications. For example, in some systems a channel comprises two communication links, each using a separate frequency. In FIG. 1A the UE 20 may transmit to the base station 26 on a first frequency, and may receive from the base station 26 on a second frequency. This pair of communication links constitutes a channel. Each base station 26 may be configured to provide service on one or more channels and each UE 20 may be configured to receive service on one or more channels.

In order to optimize network resource usage, and provide the highest quality of service, the UEs 20 may be maintained in a substantially evenly distributed channel assignment configuration. That is, communication traffic load is substantially balanced among the available channels on the available base stations. In order to maintain the balanced load in the dynamic environment of frequent UE communication link establishment and conclusion and frequent changes in which base station is currently serving an individual mobile UE, each base station 26 is configured to broadcast certain network status information to the UEs and each UE is configured to monitor the network status information and to monitor communication link quality parameters and to choose channels and base stations based on the information and the parameters. The process of choosing a channel for service may be called channel selection, and the process of choosing a particular base station transceiver for service may be called cell selection or cell reselection.

Certain standards have been developed and are currently used for managing this dynamic selection and reselection process. Such a standard is 3GPP Release 1999 (R'99) cell reselection. In accordance with R'99 cell reselection, certain network status information is broadcast. For example, System Information Block (SIB) 3, SIB 4, SIB 11, and SIB 12 data is broadcast for use by UEs for cell reselection. Additionally, SIB data can be used to calculate certain cell parameters, such as Qoffsets,n, Qhysts, Qhcss, and Qmeass, which are also used for cell reselection. As part of channel and/or cell selection UEs may also perform channel quality testing according to an adopted standard such as a suitability test in the sense of 3GPP TS 25.304. In order to minimize unnecessary reselection activity, the R'99 reselection algorithm tends to favor the current channel and cell. This tendency is called stickiness.

For example, in the network of FIG. 1A, the UEs 20 are mobile phones with users initiating, receiving and terminating phone calls while driving. As an individual UE gets farther from a currently serving base station, the signal associated with the current channel becomes weaker. The UE monitors SIB data and performs a R'99 cell reselection. As part of the R'99 cell reselection the UE determines that a new channel being served by a new cell is suitable, and begins communicating on the new channel in the new serving cell. As the UEs reselect channels and cells, a desired distribution is maintained by the reselection algorithm. Because high activity tends to lower the quality of the channels and cells, and the algorithm prefers to select higher quality channels and cells, during reselection a UE is more likely to select a lower traffic channel and cell. Thus, the traffic in the network tends to be balanced.

In addition to two-way communication, the network shown in FIG. 1A may be used for broadcast services as well. One such service is a point-to-multipoint Multimedia Broadcast/Multicast Service (MBMS). In this type of broadcast UEs subscribed to the service receive a notice of an upcoming broadcast, say results of today's football matches, from the currently serving cell. The notice contains information as to which channel the broadcast will be on. The UEs whose user's who want to participated in the broadcast tune to the correct channel, and receive the broadcast information. A result of the broadcast is that a potentially large number of UEs are congregated on the same channel.

FIG. 1B is a diagram showing an exemplary group of UEs (one of which is labeled 20) congregated on a single channel a wirelessly receiving broadcast data from a group of base stations (one of which is labeled 26). During normal operation such a congregation would overload the network because the network does not have the capacity to service such a large group of UEs on a single channel. However, during the broadcast this congregation does not overload the network because each of the UEs may be receiving large amounts of data, but is transmitting only a minimal amount of data, and the broadcast data is concentrated on a single common channel rather than consuming separate resources for each UE in the congregation. The base stations 26 broadcast the data on the published channel, and each UE 20 receives the data on that channel.

After the end of the broadcast, however, the UEs will return to normal transmission levels, and the congregation concentrated on the single channel a may overload the network resources. This can be avoided by generally broadcasting a disperse command to the UEs, which respond to the disperse command by selecting a channel and a cell for service. The results of such a dispersion will be that the UEs move to different channels and camp on cells serving those channels with a distribution like that shown in FIG. 1A, where the UEs are distributed amongst the cells on various channels a, b, c, and d.

There is therefore a need in the art for UEs to be able to "disperse" across channels in response to a disperse command in an efficient and simple manner in such a way that the resulting load is balanced across channels and cells.

SUMMARY

Embodiments disclosed herein address the above stated needs by disclosing systems, methods, and devices which effectively perform the needed dispersion. The systems, methods, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other systems, methods, and devices.

One embodiment has a remote station apparatus including a communication circuit configured to receive a disperse command, and a channel selector configured to randomly or pseudorandomly select a channel in response to the disperse command.

Another embodiment has a remote station apparatus including a communication circuit configured to receive a disperse command and to receive communication link data, a channel selector configured to select a channel in response to the disperse command, a cell selector configured to select a first cell based at least in part on the channel, and to select a camping cell based at least in part on the channel and the first cell, where the cell selector is further configured to select the camping cell before camping on any cell.

Another embodiment has a wireless communication system including a plurality of base stations, each configured to send a disperse command to initiate remote station dispersion, and a plurality of remote stations, each configured to receive the disperse command from at least one of the plurality of base stations and to randomly or pseudorandomly select a channel in response to the disperse command.

Another embodiment has a wireless communication system including a plurality of base stations, each configured to send a disperse command to initiate remote station dispersion, and a plurality of remote stations, each configured to receive the disperse command from at least one of the plurality of base stations, to select a channel in response to the disperse command, to select a first cell based at least in part on the channel, and to select a camping cell based at least in part on the channel and the first cell, where each of the remote stations is further configured to select the camping cell before camping on any cell.

Another embodiment has a method of responding to a disperse command, the method including receiving the disperse command, and randomly or pseudorandomly selecting a channel in response to the disperse command.

Another embodiment has a method of responding to a disperse command, the method including receiving the disperse command, selecting a channel in response to the disperse command, selecting a first cell based at least in part on the channel, and selecting a camping cell based at least in part on the channel and the first cell, where the camping cell is selected before camping on any cell.

Another embodiment has a remote station apparatus including means for receiving a disperse command, and means for randomly or pseudorandomly selecting a channel in response to the disperse command.

Another embodiment has a remote station apparatus including means for receiving a disperse command, and means for selecting a channel in response to the disperse command, means for selecting a first cell based at least in part on the channel, and means for selecting a camping cell based at least in part on the channel and the first cell, where the selecting means is configured to select the camping cell before camping on any cell.

Another embodiment has a wireless communication system including first means for wirelessly communicating, each configured to send a disperse command to initiate dispersion, and remote means for wirelessly communicating, each configured to receive the disperse command from the first means and to randomly or pseudorandomly select a channel in response to the disperse command.

Another embodiment has a wireless communication system including first means for wirelessly communicating, each configured to send a disperse command to initiate dispersion, and remote means for wirelessly communicating, each configured to receive the disperse command from the first means, to select a channel in response to the disperse command, to select a first cell based at least in part on the channel, and to select a camping cell based at least in part on the channel and the first cell, where each remote means for wirelessly communicating is further configured to select the camping cell before camping on any cell.

DETAILED DESCRIPTION

The word "exemplary" is used herein to mean "serving as an example, instance, or illustration." Any embodiment described herein as "exemplary" is not to be construed as necessarily preferred or advantageous over other embodiments.

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any system that is configured to facilitate remote communications amongst a plurality of devices or in the devices of such a system.

Figure 1A:
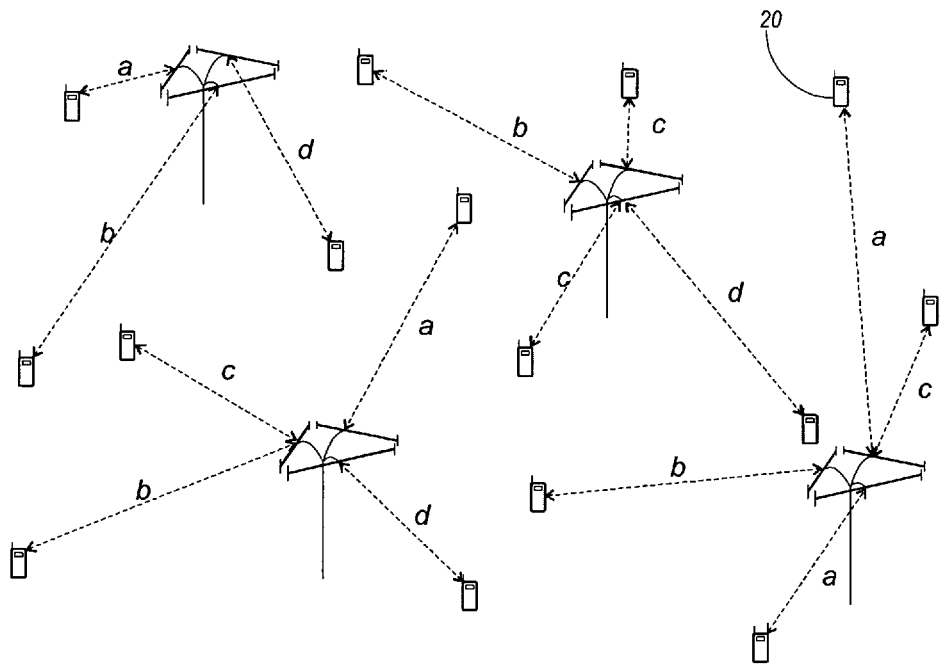
FIGS. 1A and 1B are diagrams illustrating UE/base station communication channels before and after dispersion.
Figure 1B:
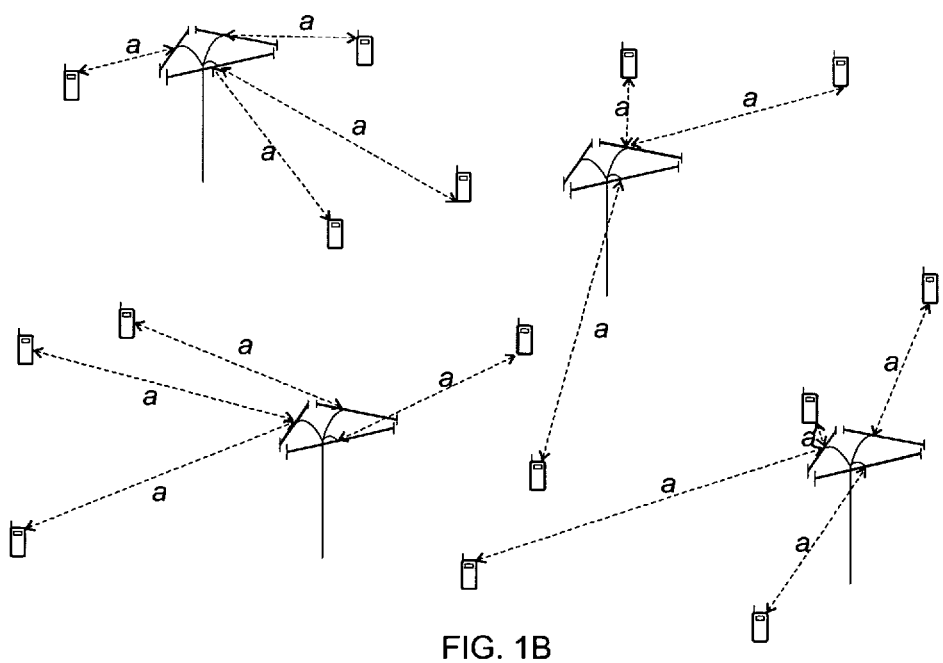

As discussed above, there is a need for a mechanism to disperse user equipment (UEs) or remote stations across channels when many such UEs are clustered on the same channel, for example, at the end of an MBMS point-to-multipoint session. Prior to dispersion, the network UE channel and cell distribution is like that shown in FIG. 1B, a large concentration of UEs on the same channel a. The results of such a dispersion is shown in FIG. 1B, where the UEs are distributed amongst the cells on various channels a, b, c, and d.

Figure 2:
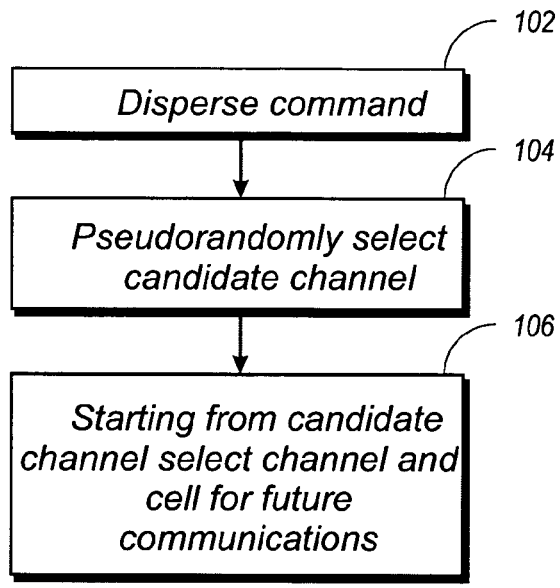
FIG. 2 is a flowchart describing an embodiment where cell selection is performed based at least in part on a random or pseudorandom selection algorithm.

FIG. 2 is a flowchart describing an embodiment where the dispersion is performed based at least in part on a random or pseudorandom selection algorithm. At step 102 the UEs receive a disperse command from a current serving cell. At step 104 each UE that has been instructed to perform dispersion applies a random or pseudorandom function, referred to as a hash function, whose results are substantially evenly distributed over a range of output values, to select a candidate channel from among the available channels. The actual function is understood to be determined by the UE implementation, with the provision only that its distribution of values is substantially even.

In some embodiments the available channels include only channels currently being served by the current serving cell or by neighboring cells, where neighboring cells include cells adjacent to the current serving cell, and in some embodiments the available channels may also include other cells with which the UE can communicate. For example, while receiving the MBMS broadcast signal, the UE monitors what other channels can be used with the current serving cell. In some embodiments the UE additionally monitors what channels can be used with neighboring cells. In some embodiments the available channels may include only channels for which there is more than one potential serving cell. The UE then uses the available channels along with the hash function to select a channel. The result of each of the UEs using a hash function to select a channel is that the UEs randomly disperse to channels with a substantially flat distribution.

For example, during the broadcast, by monitoring channel status information from its current serving cell and neighboring cells, a UE may determine that it has 10 available channels, and numbers them 1 through 10. After receiving the disperse command, to select one channel as a candidate channel, the UE uses a hash function, which takes a large number of possible input values and maps them with a substantially flat distribution to a smaller number of possible output values, in this example channel numbers 1 through 10. The hash function may, for example, use the 10 digit phone number, or a portion of the 10 digit phone number as an input, perform a set of mathematical functions on the input and with substantially equal probability produce one integer output in the range 1 through 10. It will be appreciated that any constant or variable UE value different from the corresponding value of other UEs, such as user identification, GPS location, or any other value could be used as the hash function input. The channel selected as the candidate channel in step 104 is that which corresponds to the output integer of the hash function.

In step 106 of FIG. 2 the UE selects a serving channel and a serving cell based at least in part on the selected candidate channel. In one embodiment, the UE camps on the current serving cell (e.g., the cell delivering the received MBMS broadcast) using the selected candidate channel. Alternatively, the UE could, based at least in part on communication link parameters, rank available cells serving the selected channel, and camp on the cell with the highest rank. In some embodiments the UE performs a communication link quality test, such as a cell suitability test in the sense of 3GPP TS 25.304 before camping. In some embodiments the UE performs a cell reselection such as an R'99 reselection based on the selected candidate channel.

An advantageous aspect of performing channel selection with a hash function is that it essentially guarantees uniform dispersion. That is, in contrast to the initial state where a large number of UEs are congregated on the same channel, the result of dispersing with a hash function is that the UEs are widely and substantially uniformly distributed amongst the available channels. This helps to avoid overloading network resources by balancing the UEs load across the various channels after the broadcast is over.

Figure 3:
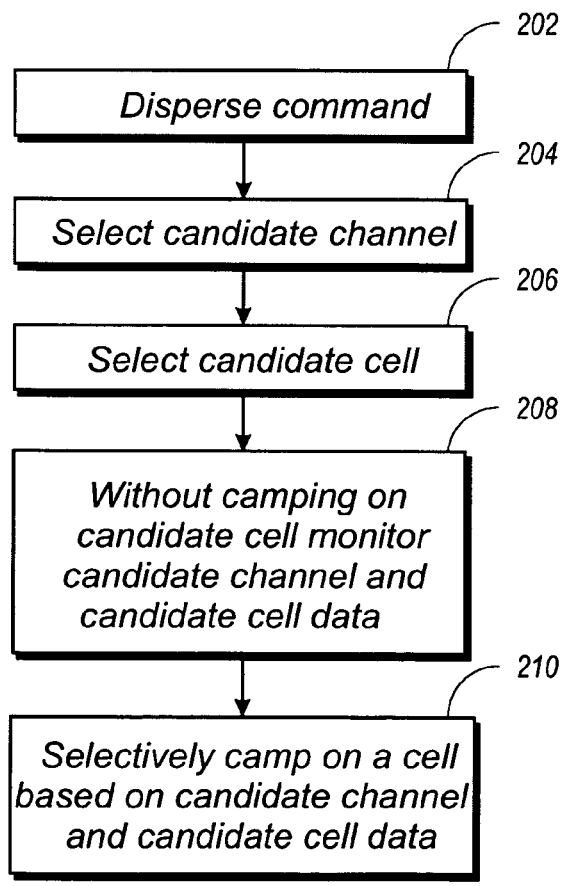
FIG. 3 is a flowchart of an embodiment in which the UE determines which cell to camp on by monitoring cell data prior to camping.

FIG. 3 is a flowchart of an embodiment in which the UE determines which cell to camp on by monitoring cell data prior to camping. At step 202 the UE receives a disperse command from a current serving cell. At step 204 the UE that has been instructed to perform dispersion selects a candidate channel. The UE may select the candidate channel in accordance with a method for selecting a channel described with reference to FIG. 2, or by another method. For example, selection of a candidate channel may be based at least in part on a function with an output distribution other than flat. The characteristics of the distribution may be determined, for example, by channel characteristics monitored prior to or after receiving the disperse command. For example, the UE may monitor which channels are served by either the current or neighboring cells and weight each of the channels by the number of serving cells. In some embodiments channels served by fewer than a predetermined minimum number of cells are excluded.

At step 206 the UE selects a candidate cell, but does not camp on the candidate cell. The UE may select the candidate cell in accordance with a method for selecting a cell described with reference to FIG. 2, or by another method. For example, The UE may monitor communication link data such as selection parameters for multiple cells. The UE may then select the candidate cell in accordance with results of a comparison of communication link data related to each cell. In some embodiments a top ranked cell of the cells or of a subset of the cells, is selected as the candidate cell. In other embodiments the candidate cell may be randomly selected from among the available cells or a subset of the available cells.

At step 208 the UE monitors communication link data such as candidate channel and candidate cell strength and quality parameters. Such data may include parameters related to suitability in the sense of 3GPP TS 25.304 and parameters related to Release '99 cell reselection, such as SIB3/4 and SIB11/12 or another standard, non-standard, or proprietary cell selection methodology. Such data may also include other parameters which may additionally or alternatively be monitored. In one embodiment, the UE tunes to the selected channel on the selected cell. Without camping on the selected cell, the UE monitors the selected channel to determine if the cell is acceptable, or reads SIB3/4 and/or SIB11/12 parameters on the candidate cell in preparation for performing a Release '99 cell reselection.

At step 210 the UE camps on a cell based at least in part on the parameters monitored at step 208. In one exemplary embodiment, at step 208 the UE, without camping on the candidate cell, monitors data and determines that the cell is acceptable. At step 210 the UE then camps on the candidate cell. Alternatively, at step 208, the UE determines that the cell is not acceptable, and again without camping collects SIB3/4 and SIB11/12 parameters. At step 210 the UE then performs a cell reselection using Release '99 rules. In some embodiments it may be satisfactory to use parameter values from the current serving cell, rather than the candidate cell, for a Release: '99 cell reselection procedure for reselecting from the candidate cell. In such systems reading parameters such as SIB3/4 and/or SIB11/12 for the candidate cell in preparation for performing a Release '99 cell reselection from the candidate cell would not be necessary, although may be performed. In some situations the cell reselection will also comprise a channel reselection.

An advantageous aspect of testing the channel or reselecting from the candidate cell before camping is that unnecessary communication traffic can be avoided. The candidate cell may be unsatisfactory for communication due to, for example, noise from other UEs or an external environmental source. As such, camping directly on the candidate cell would lead to immediate reselection away from the reselected cell. By testing or reselecting before camping, the UE may avoid camping, immediate reselection, and camping again on a new channel and cell.

Figure 4:
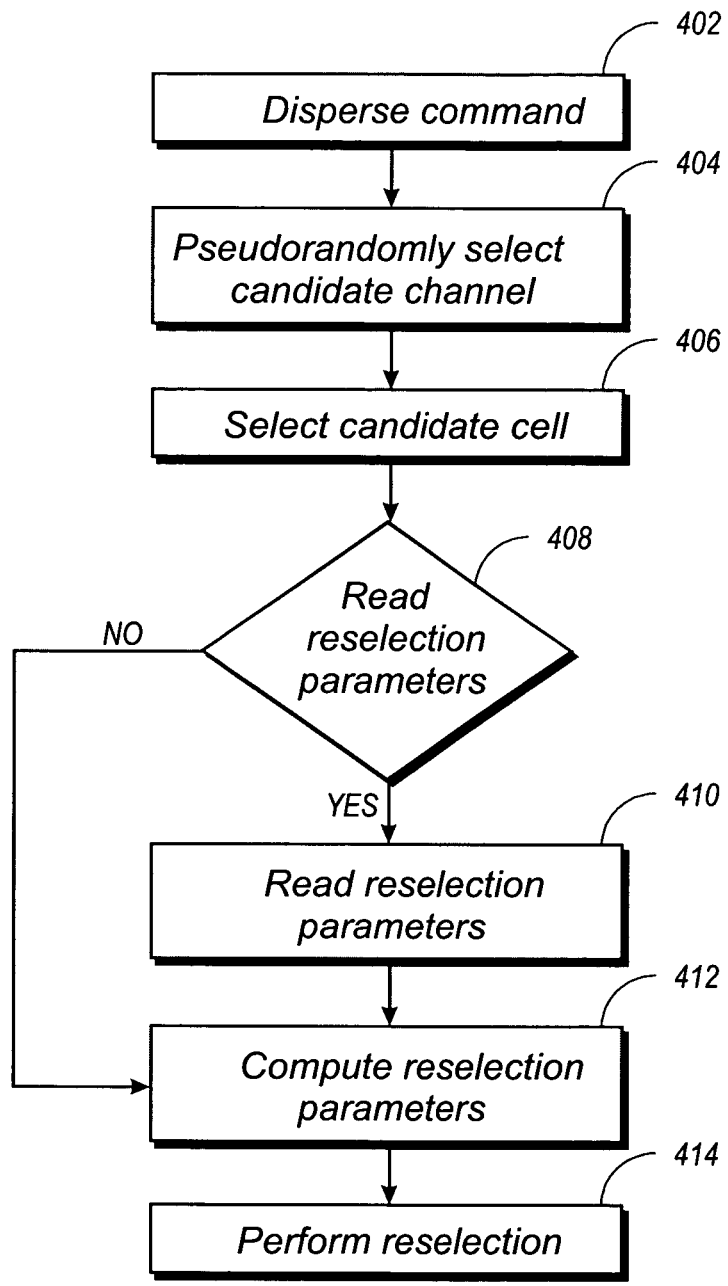
FIG. 4 is a flowchart of an embodiment with an exemplary arrangement of certain aspects.
Figure 5:
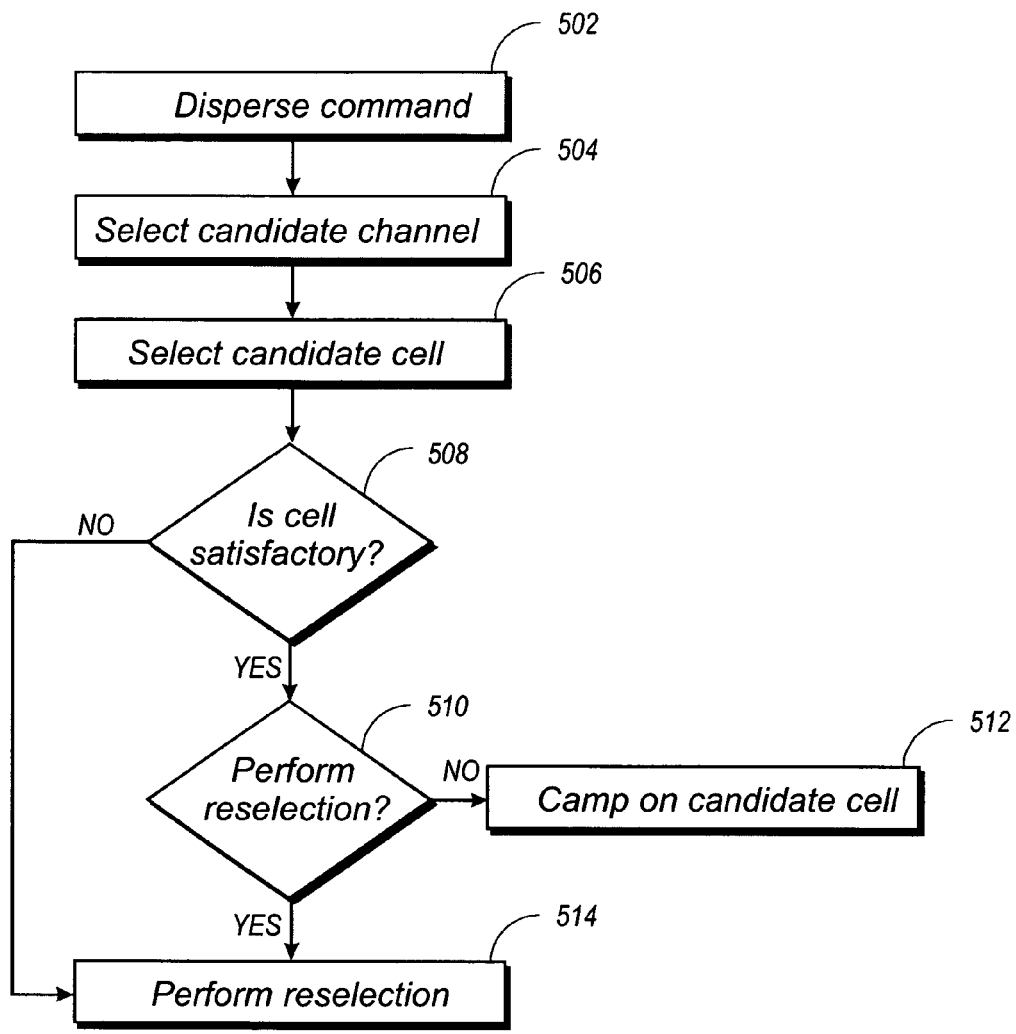
FIG. 5 is a flowchart of an embodiment with another exemplary arrangement of certain aspects.

The various aspects described above may be implemented in various combinations and arrangements. FIGS. 4 and 5 are flowcharts illustrating two exemplary arrangements of such aspects. One skilled in the art would recognize that other combinations of aspects performed in other orders are also possible.

FIG. 4 is a flowchart of one exemplary embodiment. At step 402 the UE receives a disperse command from a current serving cell. At step 404 the UE that has been instructed to perform dispersion pseudorandomly selects a candidate channel. The UE may, for example, select the candidate channel in accordance with a hash function which pseudorandomly selects a channel from among the available channels served by the current serving cell or by a neighboring cell. In some embodiments, another method of selecting the candidate channel is used.

At step 406 the UE selects a candidate cell, but does not camp on the candidate cell. The UE may select the candidate cell in accordance with results of a comparison of communication link data related to each available cell. In some embodiments a top ranked cell of the available cells or of a subset of the available cells, such as the neighboring cells, is selected as the candidate cell. In other embodiments the candidate cell may be randomly selected from among the available cells or a subset of the available cells.

At step 408 if the UE is not programmed to read selection parameters related to the candidate channel and candidate cell, the UE moves to step 412. In some embodiments reading certain selection parameters may not be necessary because, for example, all available cells are known to have identical or substantially identical selection parameter values, or because selection parameters for the available cells have been read sufficiently recently and are stored for recall. Such programming can be determined, for example, by the user, by the service provider, or can be determined based on monitored network parameters. If reading selection parameters is necessary, at step 410 selection parameters are read. This may be accomplished, for example, by the UE tuning to the candidate cell on the candidate channel, and without camping on the candidate cell, monitoring parameters broadcast from the candidate cell transmitter. This may additionally or alternatively include monitoring and measuring signal quality parameters of the candidate channel on the candidate cell. These parameters may include parameters related to Release '99 cell reselection, or another standard, such as a proprietary cell selection standard, or non-proprietary cell selection standard. At step 412 the cell selection parameters, having been read at step 410, or being otherwise available if reading was determined at step 408 to not be necessary, are used to calculate additional cell selection parameters.

For example, a UE may have stored values for SIB3/4 and is programmed to read selection parameters SIB11/12. At step 410, without camping on the candidate cell, the UE reads SIB 11/12 for the candidate cell. At step 412 the UE calculates Qoffsets,n, Qhysts, Qhcss, and Qmeass based at least in part on the SIB11/12 parameters read at step 410, and on SIB3/4 parameters previously stored.

At step 414 cell reselection is performed based at least in part on the stored, read, and/or calculated cell reselection parameters. The cell reselection may be performed according to Release '99 cell reselection, or any other cell selection process.

FIG. 5 is a flowchart of an exemplary embodiment with another arrangement of some aspects. At step 502 the UE receives a disperse command from a current serving cell. At step 504 the UE that has been instructed to perform dispersion selects a candidate channel using a method of candidate channel selection previously described or another method.

At step 506 the UE selects a candidate cell, but does not camp on the candidate cell. The UE may select the candidate cell in accordance with a method for candidate cell selection previously discussed or another method.

At step 508 a determination is made as to whether the candidate cell is satisfactory. For example, the UE may perform an acceptability test, such as a suitability test in the sense of 3GPP TS 25.304. Other tests may also be performed. Such a test may monitor signal strength and quality parameters related to the candidate cell and based at least in part on a proprietary or non-proprietary standard make the determination whether the cell is satisfactory. If the cell is found to be satisfactory, and if, at step 510, a reselection is determined to not be necessary, at step 512 the UE camps on the candidate cell. However, if a reselection is necessary, as determined at step 510, or if the cell is found to not be satisfactory at step 508, a cell reselection is performed at step 514. The results of the cell reselection will include camping on the cell chosen in the cell reselection.

As discussed above, those of skill in the art would understand that the various operations of the methods described herein may be performed in an order other than that disclosed in the specific exemplary embodiments discussed above. For example, once a cell is determined to be satisfactory, the UE may camp on the cell without an option of performing a cell reselection prior to camping. Alternatively, if a cell reselection is necessary, the UE may or may not perform a test to determine whether the candidate cell is satisfactory. In some embodiments selection of a candidate cell may occur before selection of a candidate channel. In some embodiments a cell reselection may occur before selection of a candidate channel. Likewise, various operations described may be omitted and others added without departing from the invention.

Figure 6:
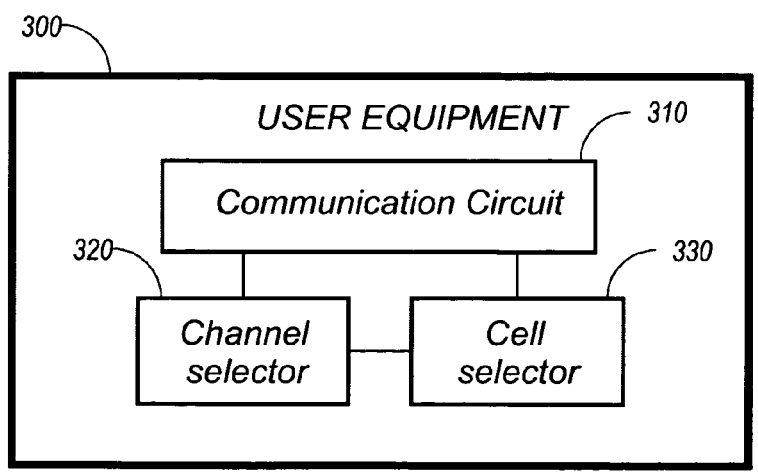
FIG. 6 is a block diagram of an UE 300 configured to perform operations of exemplary method embodiments.

FIG. 6 is a block diagram of a UE 300 configured to perform the operations discussed herein. The communication circuit 310 is configured to remotely communicate with the base station network, from which it receives the broadcast data and the disperse command. The communication circuit 310 also receives channel and cell information related to the current serving cell and neighboring cells. This information may be used by the channel selector 320 to determine available channels for use with the hash function or other algorithm for channel selection as described herein. In some embodiments the channel selector 320 may determine that the UE will camp on the current serving cell. In some embodiments the channel and cell information can also include communication link data, which may be used by the optional cell selector 330 for ranking available cells and for performing communication link quality testing as described herein. The cell selector 330 is configured to make cell camping decisions based at least in part on information received via the communication circuit 310, or on other information. The cell selector 330 may include an acceptability tester configured to determine acceptability of a cell. This determination may then be used as criteria for camping. The cell selector may additionally or alternatively include a reselector configured to determine a cell to camp on. The cell reselector may determine to camp based at least in part on communication link parameters of available cells. The cell reselector may perform reselection based at least in part on Release '99 rules, and may use parameters such as those contained in SIB3/4 and SIB11/12 in the reselection. The communication circuit 310 is further configured to receive and transmit data related to the camping operation of the UE. The functions described above, such as the channel selector 320 and the cell selector 330 may each be embodied in hardware or in firmware or software running on a processor (not shown).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A remote station apparatus comprising: a communication circuit configured to:
receive an MBMS point-to-multipoint session on a current channel; and receive a disperse command from a base station at the end of the MBMS point-to-multipoint session, wherein the disperse command is broadcast from the base station to all remote stations congregated on and wirelessly receiving broadcast data on the same channel;
a channel selector configured to select a channel from a plurality of channels including the current channel in response to the disperse command, the selection being based at least in part on a hash function for pseudorandomly selecting a channel among the plurality of channels including the current channel so as to evenly distribute the remote stations amongst the plurality of channels; and a cell selector configured to select a cell based at least in part on the selected channel and a characteristic of the cell and a suitability test.

2. The apparatus of claim 1, wherein the hash function provides results that are evenly distributed over a range of output values.

3. The apparatus of claim 1, wherein the cell selector is further configured to select the cell using at least one item selected from a group consisting of monitored cell data, selection parameters.

4. A remote station apparatus comprising:
a communication circuit configured to:
receive an MBMS point-to-multipoint session on a current channel; and receive a disperse command from a base station at the end of the MBMS point-to-multipoint session, wherein the disperse command is broadcast from the base station to all remote stations congregated on the same channel and receiving communication link data;
a channel selector configured to select a channel from a plurality of channels including the current channel in response to the disperse command, the selection being based at least in part on a hash function for pseudorandomly selecting a channel among the plurality of channels including the current channel so as to evenly distribute the remote stations amongst the plurality of channels; and
a cell selector configured to select a first cell based at least in part on the selected channel and a characteristic of the first cell and a suitability test, and to select a camping cell based at least in part on the selected channel and the first cell and the suitability test, wherein the cell selector is further configured to select the camping cell before camping on any cell.

5. The apparatus of claim 4, wherein the hash function provides results that are evenly distributed over a range of output values.

6. The apparatus of claim 4, wherein the cell selector is further configured to camp on the first cell.

7. The apparatus of claim 4, wherein the cell selector is further configured to perform a cell reselection.

8. The apparatus of claim 7, wherein the cell selector is further configured to perform the cell reselection in accordance with a standard cell reselection protocol.

9. The apparatus of claim 8, wherein the standard cell reselection protocol comprises Release '99 reselection rules.

10. The apparatus of claim 4, wherein the cell selector is configured to test the acceptability of the first cell.

11. The apparatus of claim 10, wherein the cell selector is further configured to perform a cell reselection if the first cell is determined to not be acceptable.

12. The apparatus of claim 10, wherein the cell selector is further configured to camp on the first cell if the first cell is determined to be acceptable.

13. A wireless communication system comprising:
a plurality of base stations, each configured to:
broadcast a point-to-multipoint session on a current channel; and broadcast a disperse command at the end of the MBMS point-to-multipoint session to all remote stations congregated on and wirelessly receiving broadcast data on the same channel in order to initiate remote station dispersion, wherein the disperse command instructs a plurality of remote stations to select a channel from a plurality of channels including the current channel and to select a cell, the selection of the channel being based at least in part on a hash function for pseudorandomly selecting a channel among the plurality of channels including the current channel so as to evenly distribute the remote stations amongst the plurality of channels, and the selection of the cell being based at least in part on the selected channel and a characteristic of the cell and a suitability test.

14. The system of claim 13, wherein the hash function provides results that are evenly distributed over a range of output values.

15. The system of claim 13, wherein the disperse command instructs the remote stations to select the cell using at least one selected item from a group consisting of monitored cell data, selection parameters.

16. A wireless communication system comprising:
a plurality of base stations, each configured to:
broadcast a point-to-multipoint session on a current channel; and
broadcast a disperse command at the end of the MBMS point-to-multipoint session to all remote stations congregated on and wirelessly receiving broadcast data on the same channel in order to initiate remote station dispersion, wherein the disperse command instructs a plurality of remote stations to select a channel from a plurality of channels including the current channel based at least in part on a hash function for pseudo-randomly selecting a channel among the plurality of channels including the current channel so as to evenly distribute the remote stations amongst the plurality of channels, and further to select a first cell based at least in part on the selected channel and a characteristic of the first cell, and to select a camping cell based at least in part on the channel and the first cell, wherein each of the remote stations is further configured to select the camping cell before camping on any cell.

17. The system of claim 16, wherein the hash function provides results that are evenly distributed over a range of output values.

18. The system of claim 16, wherein the remote stations further perform a cell reselection in response to the disperse command.

19. The system of claim 18, wherein the remote stations perform the cell reselection in accordance with a standard cell reselection protocol.

20. The system of claim 19, wherein the standard cell reselection protocol comprises Release '99 reselection rules.

21. A method of responding to a disperse command, the method comprising:
receiving an MBMS point-to-multipoint session on a current channel; receiving the disperse command from a base station at the end of the MBMS point-to-multipoint session, wherein the disperse command is broadcast from the base station to all remote stations congregated on and wirelessly receiving broadcast data on the same channel;
selecting a channel from a plurality of channels including the current channel in response to the disperse command, the selection being based at least in part on a hash function for pseudorandomly selecting a channel among the plurality of channels including the current channel so as to evenly distribute the remote stations amongst the plurality of channels; and
selecting a cell based at least in part on the selected channel and a characteristic of the cell and a suitability test.

22. The method of claim 21, wherein the hash function provides results that are evenly distributed over a range of output values.

23. A method of responding to a disperse command, the method comprising:
receiving an MBMS point-to-multipoint session on a current channel; receiving the disperse command from a base station at the end of the MBMS point-to-multipoint session, wherein the disperse command is broadcast from the base station to all remote stations congregated on and wirelessly receiving broadcast data on the same channel;
selecting a channel from a plurality of channels including the current channel in response to the disperse command, the selection being based at least in part on a hash function for pseudorandomly selecting a channel among the plurality of channels including the current channel so as to evenly distribute the remote stations amongst the plurality of channels;
selecting a first cell based at least in part on the selected channel and a characteristic of the first cell and a suitability test; and
selecting a camping cell based at least in part on the selected channel and the first cell and the suitability test, wherein the camping cell is selected before camping on any cell.

24. The method of claim 23, further comprising camping on the camping cell.

25. The method of claim 23, further comprising determining whether the first cell is acceptable.

26. The method of claim 23, further comprising performing a cell reselection.

* * * * *